United States Patent
Fukumura (10) Patent No.: US 7,380,787 B2
(45) Date of Patent: Jun. 3, 2008

(54) PAPER TRANSPORTATION DEVICE

(75) Inventor: Atsushi Fukumura, Kyoto (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 566 days.

(21) Appl. No.: 10/867,973

(22) Filed: Jun. 15, 2004

(65) Prior Publication Data

US 2005/0030599 A1     Feb. 10, 2005

(30) Foreign Application Priority Data

Aug. 5, 2003     (JP) .............................. 2003-286878

(51) Int. Cl.
    *B65H 5/06*     (2006.01)
(52) U.S. Cl. ...................... 271/264; 358/498
(58) Field of Classification Search ............... 271/264, 271/272; 358/498
    See application file for complete search history.

(56) References Cited

U.S. PATENT DOCUMENTS 6,877,742 B2 *     4/2005     Nishikata et al. ........... 271/264

FOREIGN PATENT DOCUMENTS

| JP | 61-92666    | 6/1986  |
|----|-------------|---------|
| JP | 05-83770    | 11/1993 |
| JP | 09-160138   | 6/1997  |
| JP | 09-222759   | 8/1997  |
| JP | 10-337929   | 12/1998 |
| JP | 2001-108072 | 4/2001  |
| JP | 2001-235815 | 8/2001  |
| JP | 2002-189319 | 7/2002  |

* cited by examiner

*Primary Examiner*—Kaitlin Joerger
(74) *Attorney, Agent, or Firm*—Hogan & Hartson LLP (57) ABSTRACT

A paper transportation device includes a paper guide body, which forms an inner guide surface of a transportation path, side frames on which a shaft of a transportation member disposed in the transportation path for transporting an original document is mounted and a gear shaft of a drive transmitting gear, which is provided in a standing condition on the side frames and transmits rotation of a drive source to the shaft of the transportation member. The paper guide body, the side frames and the gear shaft are formed integrally by resin.

11 Claims, 9 Drawing Sheets

PAPER TRANSPORTATION DEVICE

BACKGROUND OF THE INVENTION

1. Field of the Invention

The present invention relates to a paper transportation device for transporting an original document to an image scanning unit in a scanner, a facsimile, a copying machine or the like.

2. Description of the Related Art

A scanner, a facsimile, a copying machine or the like includes a paper transportation device such as an Automatic Document Feeder (ADF) that feeds a plurality of original documents sequentially. The plurality of original documents stacked on a document tray can be transported continuously and automatically to a scanning position by the paper transportation device.

Figure 9:
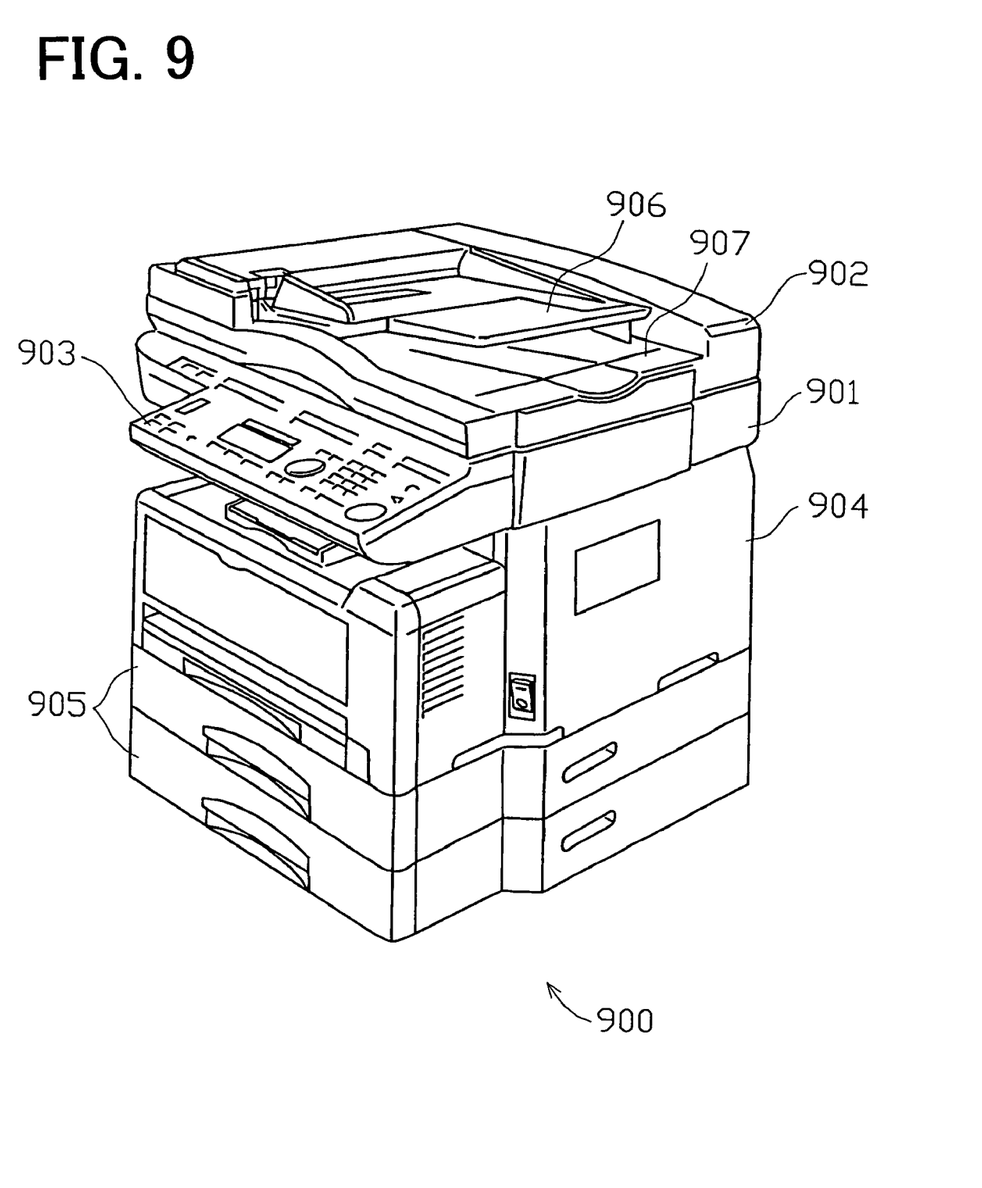
FIG. 9 is a perspective view showing an appearance of the copy-and-facsimile multifunction peripheral 900.

FIG. 9 is a schematic perspective view showing an appearance of a copy-and-facsimile multifunction peripheral 900 having an ADF. As shown in the drawing, the copy-and-facsimile multifunction peripheral 900 includes a scanning table 901, a document pressing plate 902, an operation panel 903, a main frame 904 and paper feed cassettes 905. On the scanning table 901, a platen glass where an original document is to be placed is provided. The original pressing plate 902 presses and fixes the original document on the platen glass. The operation panel 903 is used for inputting a start of a scanning process of the original document or the like. The main frame 904 includes an image recording unit which records an image onto recording paper and a transmission unit which transmits the image electrically through a public network or the like. The paper feed cassettes 905 accommodate recording papers for recording the scanned image.

In the copy-and-facsimile multifunction peripheral 900, the ADF in the document pressing plate 902 constitutes the paper transportation device. By the ADF, the sheeted original document placed on a document tray 906 is transported downwards to a paper discharge tray 907, which is provided below the document tray 906, while front and back sides of the original document are reversed (so as to make a U-turn). While being transported, when the original document passes a scanning position on the platen glass, an image of the original document is scanned by an image scanning unit such as a Charge Coupled Device (CCD) provided inside the scanning table 901.

In the conventional paper transportation device, a transportation path leading from the document tray 906 via the scanning position to the paper discharge tray 907 is formed of an outer guide surface and an inner guide surface having a shape of the letter U sideways. For example, the outer guide surface is formed of a housing of the document pressing plate 902. The inner guide surface is formed of a paper guide disposed inside the document pressing plate 902.

Metal plates are secured on both sides of the paper guide by screws. Bearings are mounted in holes formed on the metal plates, and a transportation roller shaft on which a transportation roller made of silicon rubber is secured is provided appropriately. Accordingly, the transportation roller is disposed at a prescribed position in the transportation path, and the original document is transported through the transportation path by rotation of each transportation roller.

Furthermore, in the document pressing plate 902, a metal gear stud is secured to the metal plate between two metal brackets by a caulk. A drive transmitting gear is supported axially by the gear stud. In addition, a drive unit, which includes a motor for applying a drive force to the drive transmitting gear, is provided in the document pressing plate 902. The drive force is transmitted from the motor of the drive unit to the transportation roller shaft. According to the above-described conventional paper transportation device, although rigidity is high, there is an increase in weight. In addition, a number of components that constitute the paper guide and the drive unit or the like becomes large, and an assembling process is complicated. Therefore, the paper transportation device results being expensive, and a maintenance work is troublesome.

Thus, there is proposed a paper transportation device in which a paper guide, which is a guide surface of a transportation path having a shape of the letter U sideways, is formed integrally by a frame made of resin such as plastics. Accordingly, a number of components of the paper guide or the like and a number of assembling steps can be reduced, and the cost of the paper transportation device can be reduced.

However, since paper is transported while being slid against the guide surface of the paper guide, static electricity is generated by friction of the paper and the paper guide, and the static electricity is accumulated on the paper. As a result, there are cases in which the transported paper is skewed by being adhered to the paper guide or the like or a transportation speed becomes unstable, and an image quality of a scanned image is deteriorated. If the paper guide is made of resin, such a generation of the static electricity becomes even more apparent.

Recently, the scanner, the facsimile and the copying machine or the like are demanded to be even more downsized and economical. In addition, the paper transportation device to be equipped in these machines are also demanded to be even more downsized and economical. Therefore, a reduction in the number of components and a simplification of the assembling process are required even more.

Moreover, in the scanner, the facsimile and the copying machine or the like, recycling of resources or the like is becoming important. Each of the components of the paper transportation device is required to be disassembled according to different kinds of materials such as metals and plastics, and then to be reused or disposed. Therefore, not only the assembling process but also the disassembling process carried out when disposing the components is preferable to be simplified.

SUMMARY OF THE INVENTION

The present invention has been developed in view of the above-described disadvantages. An advantage of the present invention is to provide a paper transportation device which can reduce cost and size by a simple structure and which can be disassembled easily when disposing the device.

According to an aspect of the present invention, a paper transportation device includes a paper guide body, side frames and a gear shaft of a drive transmitting gear that are formed integrally by plastics. The paper guide body is an inner guide surface of a U-shaped document transportation path. The side frames include bearings for roller shafts of rollers disposed in the transportation path for transporting paper. The gear shaft of the drive transmitting gear is provided on the side frame in a standing condition and transmits rotation of a drive source to the roller shafts. Further, the rollers for transporting the paper include a transportation roller for transporting the paper through the transportation path, and also a paper feed roller for feeding the paper from a document tray to the transportation path.

A tip end of the gear shaft is fit in a supporting hole of a bracket that supports the drive source in a manner that there is play between the tip end of the gear shaft and the supporting hole. Accordingly, the gear shaft is supported. A charge elimination guide made of an electrically conductive member is disposed on the paper guide body. The charge elimination guide constitutes a guide surface downstream of a turning part of the transportation path having the shape of the letter U sideways. An elastic film is provided at a position facing the charge elimination guide at the outer guide surface of the transportation path having the shape of the letter U sideways. The elastic film guides the transported paper so that the paper makes contact with the charge elimination guide. The paper guide body, the side frames and the gear shaft of the drive transmitting gear are formed integrally. Therefore, a process for mounting the side frames to the paper guide body and a process for mounting the gear shaft to the side frames become unnecessary. As a result, when compared with the conventional paper transportation device, a number of components and a number of assembling steps of the paper transportation device can be reduced even more, and the cost of the paper transportation device can be reduced further.

BRIEF DESCRIPTION OF THE DRAWINGS

FIG. 7 is a plan view of the guide body 102a.

DETAILED DESCRIPTION OF THE PREFERRED EMBODIMENTS

Figure 1:
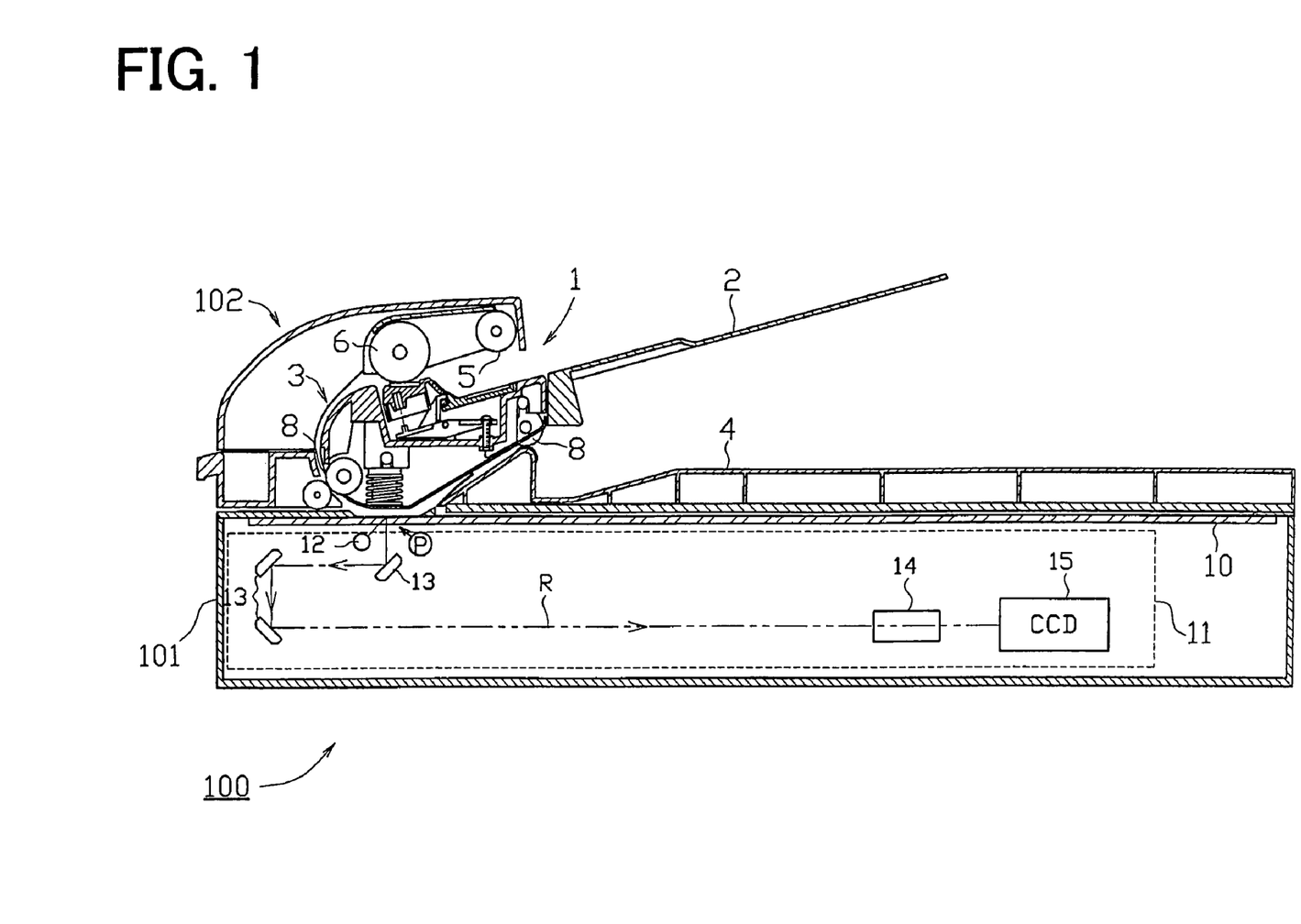
FIG. 1 is a cross-sectional view showing a configuration of an upper part of a copy-and-facsimile multifunction peripheral 100 according to an embodiment of the present invention.

FIG. 1 is a cross-sectional view showing an upper part of a copy-and-facsimile multifunction peripheral 100 having a paper transportation device 1 according to an embodiment of the present invention. As shown in the drawing, the copy-and-facsimile multifunction peripheral 100 includes a scanning table 101 and a document pressing plate 102. An original document to be scanned is placed on a platen glass 10 provided on an upper surface of the scanning table 101. The document pressing plate 102 can be opened and closed so as to cover the platen glass 10. Although not shown in the drawing, the copy-and-facsimile multifunction peripheral 100 includes an operation panel for inputting a start of a scanning process of the original document or the like, an image recording unit for recording an image onto recording paper, a transmission unit for electrically transmitting the image, and a paper feed cassette for accommodating recording papers for recording the scanned image or the like. The known structures are exemplary and optional.

A paper transportation device 1 is disposed as an Automatic Document Feeder (ADF) in the document pressing plate 102. The paper transportation device 1 feeds original documents consecutively to a scanning position P on the platen glass 10. An original document is fed into a transportation path from a document tray 2 by the paper transportation device 1. The original document is transported along a paper guide 3 downwards to a scanning position P while being reversed so as to make a U-turn. When the original document passes the scanning position P, an image of the original document is scanned by a scanning unit 11. Then, the original document is discharged onto a paper discharge tray 4 located below the document tray 2.

Further, the original document transported by the paper transportation device 1 can be standard paper of various sizes used generally in a copying machine and a printer. Alternatively, the original document can be paper which has a thickness capable of passing through the transportation path and which can be curved along the transportation path having the shape of the letter U sideways.

The scanning unit 11 is provided inside the scanning table 101. The scanning unit 11 includes a light source 12 which irradiates light to the scanning position P, reflecting mirrors 13 which guide reflected light R from the original document towards a prescribed direction, a condenser lens 14 which focuses the reflected light R, and a Charge Coupled Device (CCD) 15 which converts the focused light into an electric signal and outputs the electric signal. That is, the scanning unit 11 is a CCD scanning unit of a reduced optical system.

The image of the original document transported through the transportation path is scanned at the scanning position P by the scanning unit 11. The reflected light R from the original document is guided to the CCD 15 and an image is formed. After an analog/digital conversion and a shading process or the like are executed, an image signal converted into an electric signal is recorded onto recording paper by the image recording unit such as the printer, and transmitted electrically by the transmission unit such as a codec.

Figure 2:
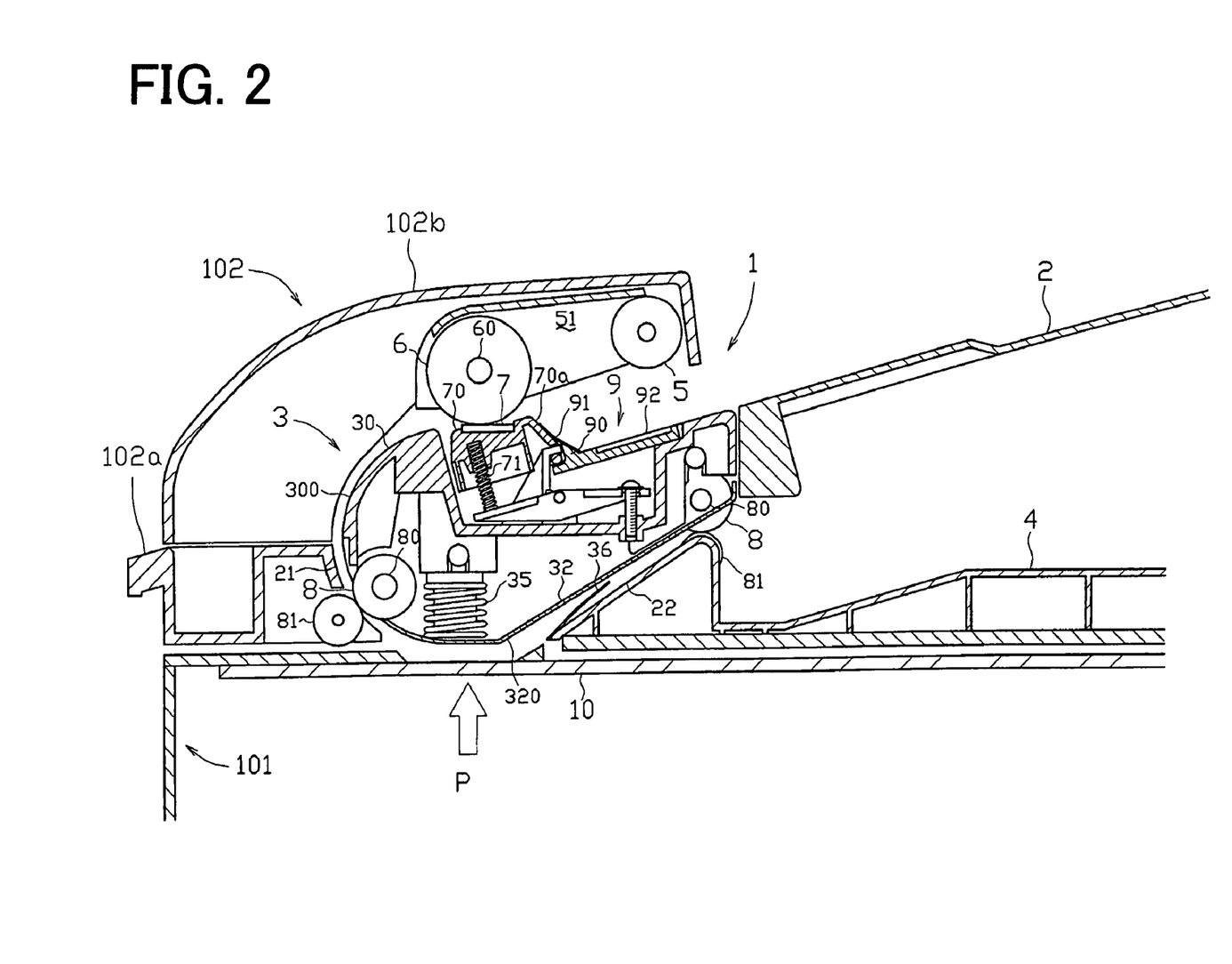
FIG. 2 is an enlarged cross-sectional view showing a configuration in proximity to a paper transportation device 1.

FIG. 2 is an enlarged cross-sectional view showing a configuration in proximity to the paper transportation device 1. As shown in the drawing, the paper transportation device 1 includes the document tray 2, the paper guide 3, the paper discharge tray 4, a pick-up roller 5, a paper feed roller 6, a separating pad 7 and transportation rollers 8. The document tray 2 holds a plurality of original documents under a stacked state. The paper guide 3 is provided downstream of the document tray 2. The paper discharge tray 4 holds the transported original documents under a stacked state. The pick-up roller 5 and the paper feed roller 6 feed the original documents stacked on the document tray 2 into the transportation path. The separating pad 7 is pressed against the paper feed roller 6. The transportation rollers 8 transport the original document through the transportation path.

As shown in the drawing, in an upper part of the document pressing plate 102, the document tray 2 is provided slightly slanting in a direction to supply the original documents. A plurality of original documents are stacked on the upper surface of the document tray 2. When a user places the original documents on the document tray 2, the original documents are placed with leading edges of the original documents aligned at a downstream end of the document tray 2. Although not shown in the drawing, a movable guide member is provided on the document tray 2 for restricting a position of the original documents in a width direction and preventing the original documents from being fed askew.

The transportation path having a shape of the letter U sideways is formed downstream of the document tray 2 and connected to the paper discharge tray 4. The paper guide 3 is disposed inside the document pressing plate 102 to form an inner guide surface of the transportation path. The cover body 102a and an ADF cover 102b of the document pressing plate 102 form an outer guide surface of the transportation path.

The outer guide surface of the transportation path can be provided separately in the document pressing plate 102 as a guide plate formed of a curved iron plate or the like. However, to reduce the number of components and simplify the assembling process, the cover body 102a and the ADF cover 102b of the document pressing plate 102 and the outer guide plate are preferable to be formed integrally by using plastics material. A document guide 9 is provided on an upper surface of the paper guide 3.

The document guide 9 includes a curved portion 90 and a guide film 91. The curved portion 90 is curved upwards towards a surface of the paper feed roller 6. The original document fed from the document tray 2 is guided to a separating pad holder 70 by the curved portion 90 and the guide film 91. The separating pad 7 is adhered on an upper surface of the separating pad holder 70. A slope 70a is formed on the separating pad holder 70. The slope 70a guides the original document towards an upstream side of the separating pad 7. The original document guided along the guide film 91 is guided along the slope 70a so as to make contact with the surface of the paper feed roller 6. By the curved portion 90 and the guide film 91 of the document guide 9 and the slope 70a of the separating pad holder 70, the plurality of the original documents stacked on the document tray 2 can remain under the stacked state without flowing into the transportation path.

When the original documents are placed on the document tray 2, the leading edge of each of the original documents is displaced askew along the curved portion 90 and the slope 70a. Accordingly, the original documents that were in close contact with one another are loosened and the original documents can be separated easily from an uppermost sheet. As a result, multi-feeding of the original documents is prevented. Moreover, the guide film 91 prevents the original document from being caught in a joint of the document guide 9 and the separating pad holder 70. As a result, the leading edge of the original document is guided reliably and smoothly to a prescribed position. Further, the separating pad holder 70 and the document guide 9 are not necessarily provided over the entire range in the width direction on the upper surface of the paper guide 3.

The paper feed roller 6 is disposed above the paper guide 3. The paper feed roller 6 rotates while making contact with the original document fed from the document tray 2 and feeds the original document to the transportation path. For example, a silicon or Ethylene Propylene Diene Methylene (EPDM) terpolymer roller is secured on a metal roller shaft 60 to form the paper feed roller 6. The roller shaft 60 is supported rotatably on the paper guide 3 via a bearing or the like. A structure in which the paper guide 3 supports the roller shaft 60 will be described later.

The pick-up roller 5 is disposed upstream of the paper feed roller 6. The pick-up roller 5 feeds the uppermost sheet of the original documents stacked on the document tray 2. In the same manner as the paper feed roller 6, the pick-up roller 5 also rotates while making contact with the original document and feeds the original document to the transportation path. The pick-up roller 5 is supported by a swing arm 51 which swings vertically via a paper feed clutch (not shown) so that the pick-up roller 5 can make contact with the document guide 9 or move away from the document guide 9. Under a normal state, for example, when placing the original documents on the document tray 2, the pick-up roller 5 is located away from the document guide 9 by the swing arm 51 swinging. When feeding the original documents, the pick-up roller 5 is lowered by the swing arm 51 swinging so as to make contact with the uppermost sheet of the original documents. Then, by the rotation of the pick-up roller 5 and the paper feed roller 6, the uppermost sheet of the original documents is fed into the transportation path.

A cork pad 92 is adhered on the upper surface of the document guide 9, at a position to make contact with the pick-up roller 5. Accordingly, even when the original documents stacked on the document tray 2 become one sheet, the original document can be nipped by the pick-up roller 5 and the cork pad 92 and fed reliably into the transportation path. Further, the pick-up roller 5 can be lowered until making contact with the document guide 9. Therefore, even when a thickness of a stack of original documents changes due to a number of sheets in the original documents, the pick-up roller 5 can always make contact with the uppermost sheet. A presence or an absence of the original document on the document tray 2 is detected by a document set sensor (not shown). In accordance with the detected signal, a control unit controls the operations of the pick-up roller 51, the swing arm 51 and the paper feed roller 6.

Meanwhile, the separating pad 7 is provided below the paper feed roller 6. A friction coefficient of the separating pad 7 with respect to the original document is lower than a friction coefficient of the paper feed roller 6 with respect to the original document and higher than a friction coefficient of the original documents. For example, the separating pad 7 is made of urethane resin.

Such a separating pad 7 is adhered on the upper surface of the separating pad holder 70. The separating pad holder 70 is locked at a prescribed position on the paper guide 3 in a manner capable of being swung. In addition, the separating pad holder 70 is urged upwards by a coil spring 71. Accordingly, the separating pad 7 is contacted against the surface of the paper feed roller 6 and can be swung downwards according to the thickness of the original document that passes through the contacting part. Although details are not shown in the drawing, the separating pad 7 is not required to be provided over the entire range in an axial direction of the paper feed roller 6. The separating pad 7 can be provided at a part of the positions where the original documents of various sizes from a minimum scanning width to a maximum scanning width commonly pass, if the separating pad 7 is provided to generate a frictional force sufficient for separating the original documents.

In the transportation path having the shape of the letter U sideways, the transportation rollers 8 for transporting the original documents are disposed at a position directly downstream of the turning part (U-turn part) and at a position located most downstream of the transportation path, respectively. The torque from a drive source such as a motor is transmitted to roller shafts 80 and the transportation rollers 8 are rotated. The roller shafts 80 are also supported rotatably on the paper guide 3. Driven rollers 81, which are rotated in response to the rotations of the transportation rollers 8, are disposed at a position facing the transportation rollers 8 so as to sandwich the transportation path. The original document is transported while being nipped by the transportation rollers 8 and the driven rollers 81. Further, the above-described arrangement of the transportation rollers 8 is an example. According to a shape or a distance of the transportation path, the number of the transportation rollers 8 can be increased or reduced appropriately.

Figure 3:
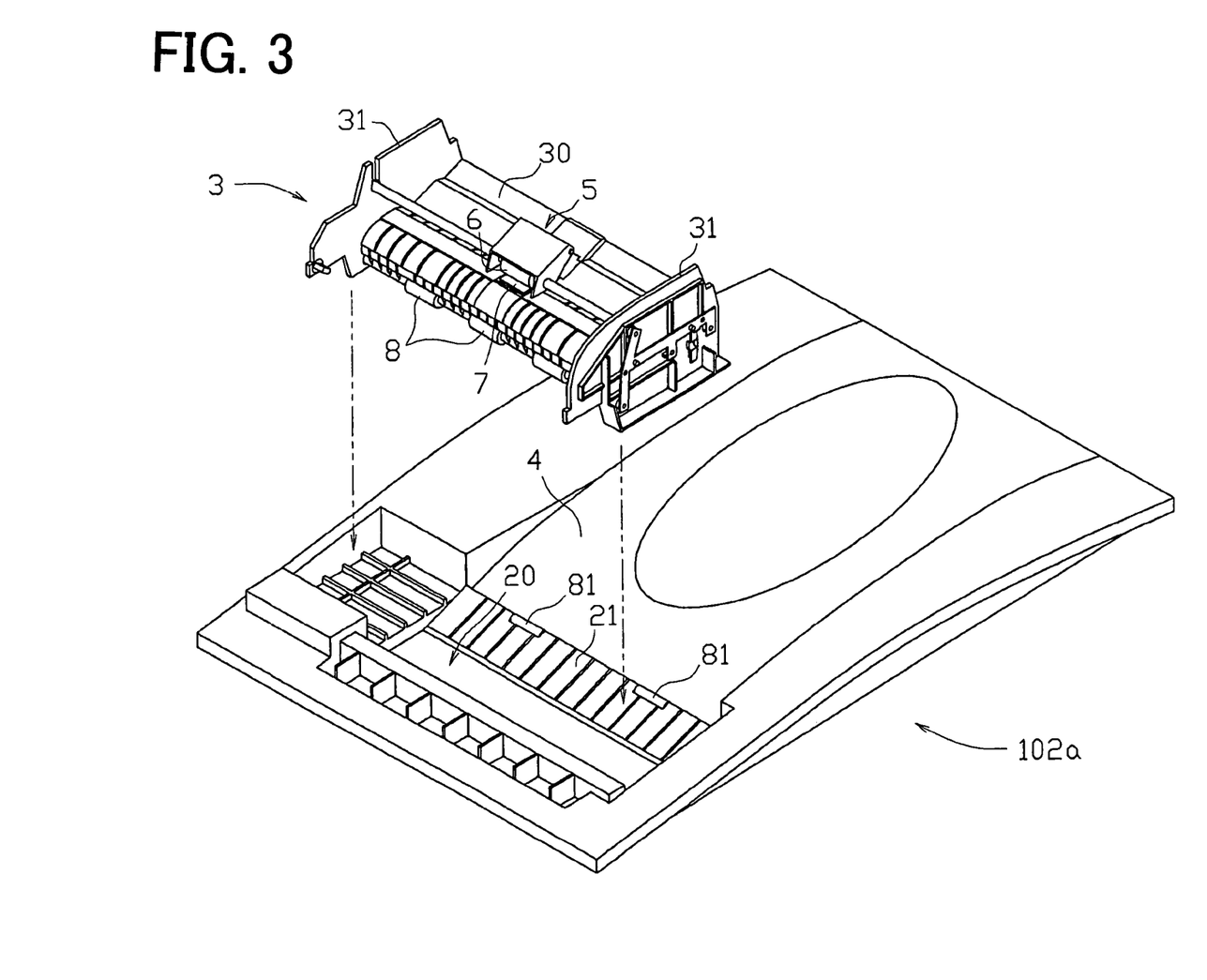
FIG. 3 is an exploded perspective view showing an assembly of a guide body 102a and a paper guide 3.

Next, referring to FIG. 2 through FIG. 6, a structure of the paper guide 3 will be described. As shown in FIG. 3, the pick-up roller 5, the paper feed roller 6, the separating pad 7 and the transportation rollers 8 are assembled on the paper guide 3. Furthermore, a drive gear (not shown) or the like is assembled on the paper guide 3. The paper guide 3 is disposed on the cover body 102a of the document pressing plate 102. Although not shown in the drawing, the ADF cover 102b is disposed capable of being opened and closed on the cover body 102a on which the paper guide 3 is assembled.

Figure 4:
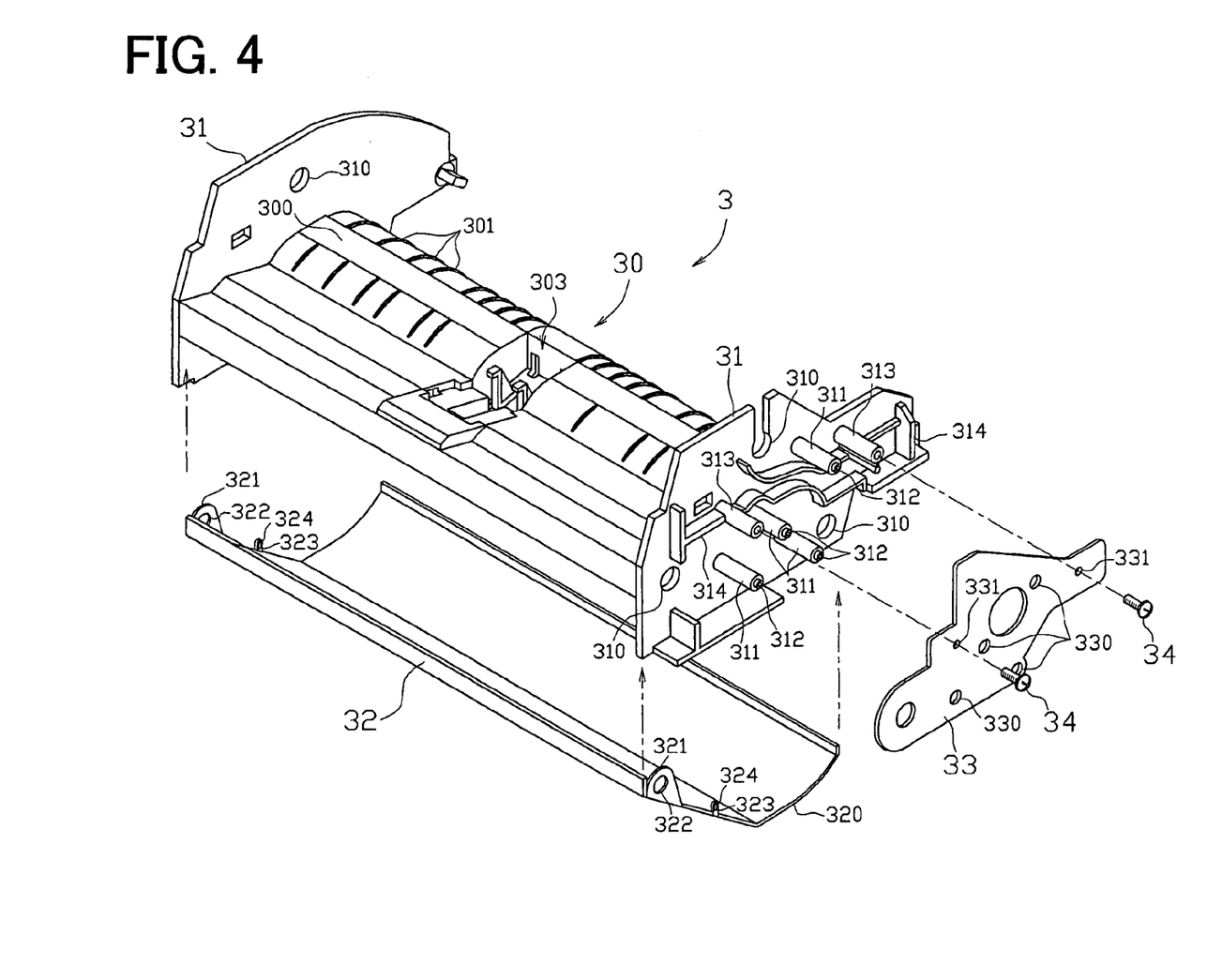
FIG. 4 is an exploded perspective view showing a configuration of the paper guide 3.

As shown in FIG. 4, the paper guide 3 is formed of a paper guide body 30 and side frames 31, which are formed integrally by plastic materials, and a charge elimination guide 32. The paper guide body 30 constitutes the transportation path having the shape of the letter U sideways. The side frames 31 are provided at both sides of the paper guide body 30. The charge elimination guide 32 is disposed downstream of a turning part of the paper guide body 30. The plastic materials of the paper guide body 30 and the side frames 31 are synthetic resins that can be formed integrally by using a mold. For example, Acrylonitrile Butadiene Styrene (ABS), high impact polystyrene or the ABS or the high impact polystyrene added with a reinforcement material such as a glass fiber can be used as the plastics materials of the paper guide body 30 and the side frames 31.

Figure 5:
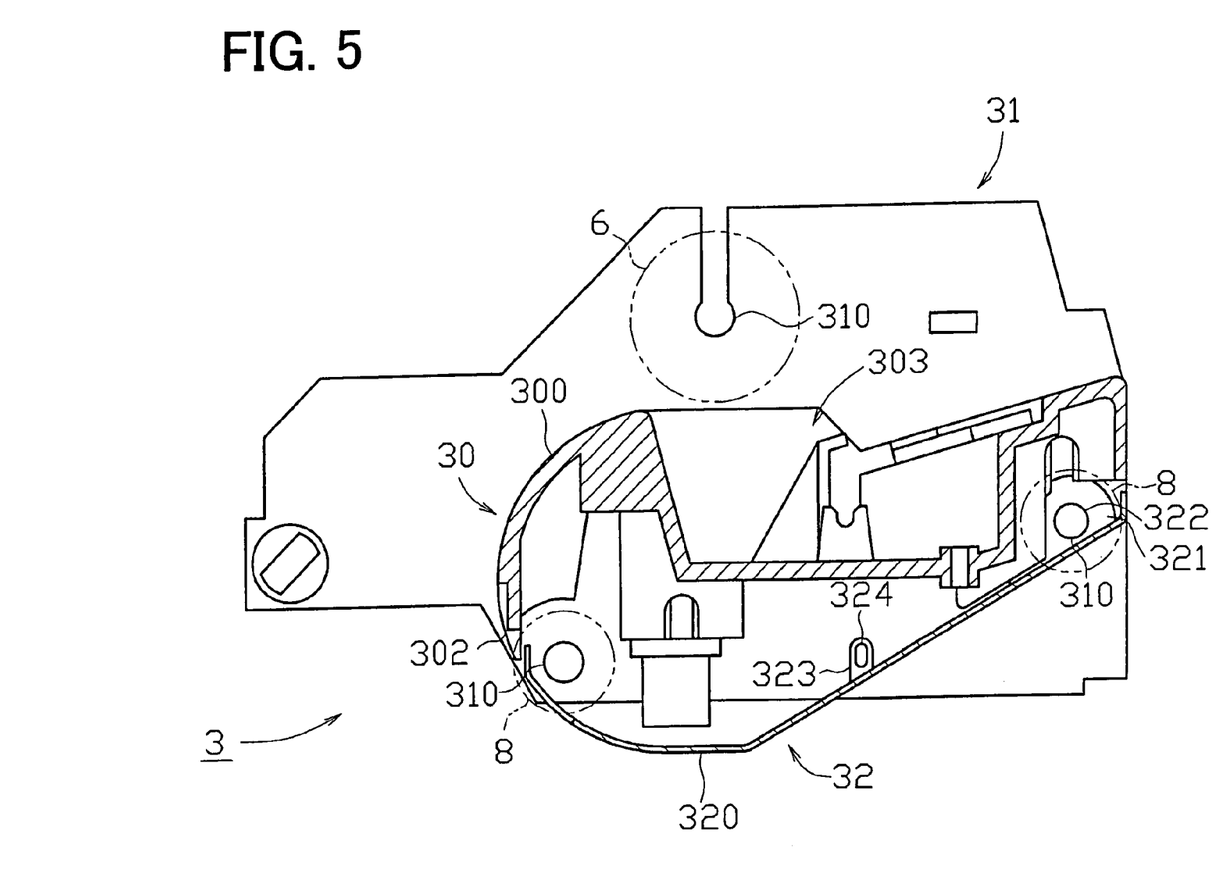
FIG. 5 is a lateral cross-sectional view showing the configuration of the paper guide 3.

The paper guide body 30 includes a guide surface 300 which an upstream side of an upper surface is slanted in the same manner as the document tray 2 and which a downstream side is curved downwards. The guide surface 300 constitutes the inner guide surface upstream of the turning part of the transportation path having the shape of the letter U sideways. Paper feeding ribs 301 are provided in rows in the width direction at the curved portion of the guide surface 300. The paper feeding ribs 301 reduce a contacting surface of the guide surface 300 and the original document that makes a U-turn while sliding against the guide surface 300. Accordingly, a frictional force applied to the original document is reduced. Since the paper guide body 30 and the side frames 31 are formed integrally, it is necessary to form the paper guide body 30 and the side frames 31 in consideration to a shape that can be removed from the mold. Therefore, as shown in FIG. 5, as a position where the guide surface 300 becomes vertical, a downstream edge of the guide surface 300 is formed so that the mold that forms the paper guide body 30 and the side frames 31 can be removed easily downwards.

On the downstream edge of the guide surface 300, a tab-like paper feeding rib 302 is formed protruding downwards from the downstream edge. An outer peripheral surface of the paper feeding rib 302 is the same surface as the guide surface 300. The paper feeding rib 302 is curved towards a downstream side from the turning part. By providing the downstream edge of the guide surface 300 as the above-mentioned vertical position and providing the paper feeding rib 302 to protrude downwards from the downstream edge of the guide surface 300, the paper guide body 30 can be formed in a shape easily removable from the mold. The original document transported along the guide surface 300 is guided to an upstream edge of the transportation roller 8 and the charge elimination guide 32. As shown in FIG. 4 and FIG. 5, a concave 303 is formed at a center in the width direction of the guide surface 300. The concave 303 locks or fits the separating pad holder 70 and the document guide 9.

The side frames 31 are plate-shaped that are formed integrally at both sides of the paper guide body 30. Through holes 310 as bearings for the roller shaft 60 of the paper feed roller 6 and the roller shafts 80 of the transportation rollers 8 are formed through the side frames 31. The through holes 310 are the bearings of each of the roller shafts 60 and 80, and the paper feed roller 6 and the transportation rollers 8 are supported at prescribed positions with respect to the paper guide body 30.

Although not shown in the drawing, each of the roller shafts 60 and 80 is inserted rotatably through each pair of through holes 310 of the side frames 31. A drive gear for each of the roller shafts 60 and 80 is provided at an outer edge of the side frames 31. The rotation of the motor is transmitted to the drive gear, and each of the roller shafts 60 and 80 is rotated. The drive transmitting gear, which transmits the drive from the motor, is also supported axially by the side frames 31.

In detail, as shown in FIG. 4, the drive gears for each of the roller shafts 60 and 80 are provided at an outer side of the side frame 31 located towards the front in the drawing. Gear studs (gear shafts) 311 which axially support the drive transmitting gear are provided on the side frame 31 in a standing condition. Four gear studs 311 are provided at prescribed positions of the side frame 31 so as to protrude outwards in a horizontal direction. Each of the gear studs 311 is also formed integrally with the paper guide body 30 and the side frames 31 by the plastic materials. The positions of the gear studs 311 are set appropriately according to the positions of the roller shafts 60 and 80, the position of the motor or a diameter of the gear or the like, and are not fixed.

As described above, the paper guide body 30, the side frames 31, the through holes 310 and the gear studs 311 are formed integrally. Accordingly, an assembling process for assembling the side frames 31 to the paper guide body 30 and an assembling process for assembling the gear studs 311 to the side frame 31 become unnecessary. As a result, a number of components and a number of assembling steps can be reduced.

A diameter of a tip end of each of the gear studs 311 is narrowed to form an engaging portion 312. Each of the engaging portions 312 is fit in each of supporting holes 330 of a bracket 33 that supports the motor (drive source) (not shown) in a manner that there is play between each of the engaging portions 312 and each of the supporting holes 33. In detail, the bracket 33 is an iron plate which applies a torque to the drive transmitting gear and supports the motor that rotates each of the roller shafts 60 and 80. The motor is secured on the bracket 33 by screw cramps or the like. A detailed description on the supporting structure of the motor by the bracket 33 will be omitted.

Supporting studs 313 are provided in a standing condition at prescribed positions on the side frame 31 on which the gear studs 311 are provided in a standing condition. The supporting studs 313 secure the bracket 33 on the side frame 31 under a prescribed interval. A screw hole is formed on a tip end of each of the supporting studs 313. Through holes 331 are formed through the bracket 33 according to a position of each of the supporting studs 313. By inserting screws 34 through the through holes 331 and screwing together in the screw hole of each of the supporting studs 313, the bracket 33 can be secured on the side frame 31.

Figure 6A:
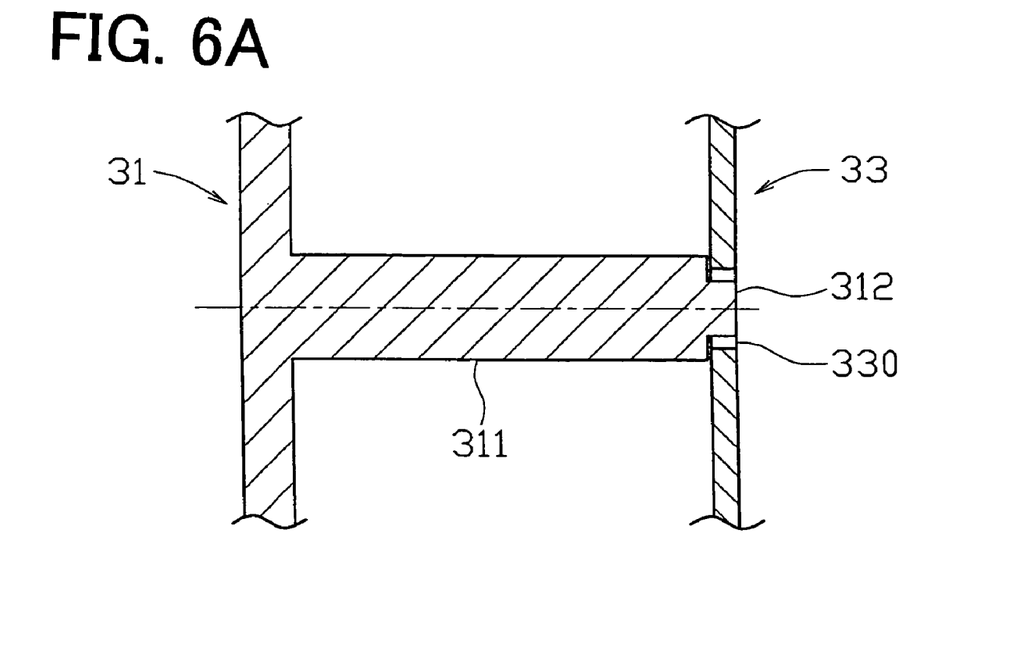
FIG. 6A is an enlarged cross-sectional view showing a state in which an engaging portion 312 of a gear stud 311 is fit in a supporting hole 330 of a bracket 33 in a manner that there is play between the engaging portion 312 and the supporting hole 330.
Figure 6B:
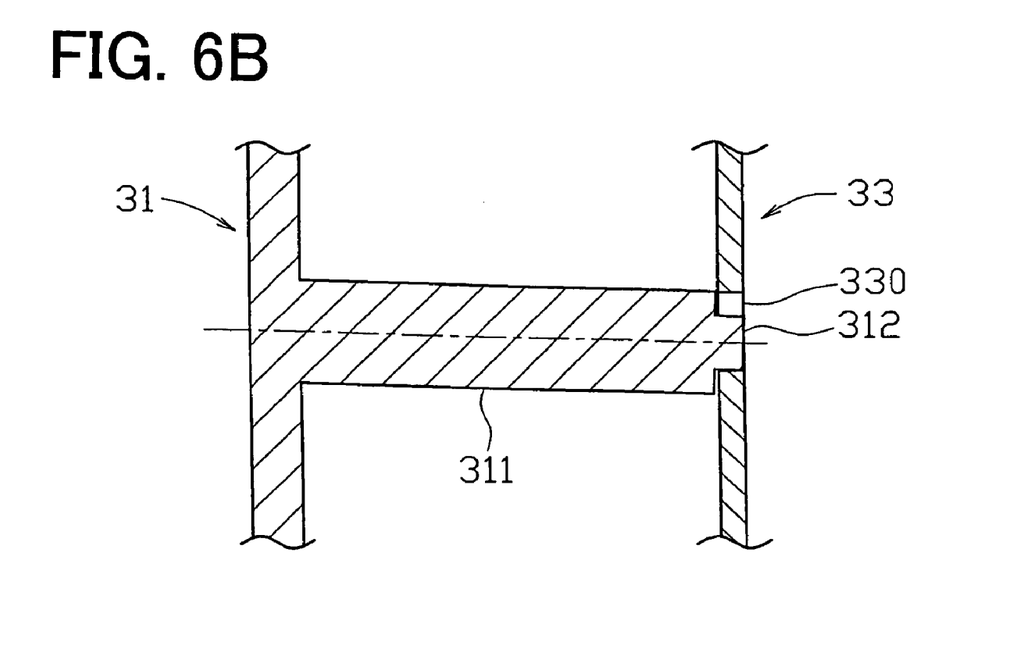
FIG. 6B is an enlarged cross-sectional view showing a state in which the gear stud 311 is slanted, and supported by the supporting hole 330.

Each of the supporting studs 313 is also formed integrally with the paper guide body 30 and the side frame 31 in the same manner as the above-described gear studs 311. To reinforce each of the supporting studs 313, reinforcement ribs 314 are formed integrally on the side frame 31 so as to be connected to each of the supporting studs 313. As described above, the supporting holes 330, where the engaging portion 312 of each of the gear studs 311 can be fit in a manner that there is play between each of the supporting holes 330 and each engaging portion 312, are formed through the bracket 33 secured on the side frame 31. Accordingly, the bracket 33 is secured on the side frame 31. As shown in FIG. 6A, the engaging portion 312 of each of the gear studs 311 is fit in the supporting hole 300 in a manner that there is play between the engaging portion 312 and the supporting hole 300. Therefore, an external force is applied to the gear stud 311 formed integrally with the side frame 31 or the like by the plastic materials. As shown in FIG. 6B, when the gear stud 311 is slanted, the engaging portion 312 is supported by the supporting hole 330 and the slanting of the gear stud 311 is restricted. Accordingly, the gear stud 311 is reinforced and prevented from being damaged.

As shown in FIG. 4 and FIG. 5, the charge elimination guide 32 disposed downstream of the turning part of the paper guide body 30 is formed by a curved or bent electrically conductive member such as a plate metal. A lower surface 320 of the charge elimination guide 32 constitutes the inner guide surface downstream of the turning part of the transportation path having the shape of the letter U sideways. At both sides of the downstream edge of the charge elimination guide 32, protrusions 321 are formed vertically upwards from the lower surface 320. A through hole 322 is formed though each of the protrusions 321. The roller shaft 80 of the transportation roller 8, which is supported by the through holes 310 of the side frames 31, is inserted through the through holes 322 of the protrusions 321. Accordingly, the charge elimination guide 32 is provided between the side frames 31 in a manner capable of swinging. Moreover, at prescribed positions on both sides of the charge elimination guide 32, protrusions 323 are formed vertically upwards from the lower surface 320. A long hole 324 is formed through each of the protrusions 323.

A screw is inserted through each of the long holes 324 of the protrusions 323 and the charge elimination guide 32 is screwed onto the side frames 31. Accordingly, the swing of the charge elimination guide 32 is restricted within the range of the long holes 324. As shown in FIG. 2, the charge elimination guide 32 assembled as the paper guide 3 is urged downwards by a coil spring 35. According to a reactive force from the original document or the like that passes through the transportation path, the charge elimination guide 32 can swing upwards within a fixed range. When the transported original document makes contact with such a charge elimination guide 32, the static electricity of the original document generated by the friction with the paper guide body 30 can be eliminated.

The friction between the original document and the paper guide body 30 can be assumed to be maximum at the turning part where the original document makes a U-turn. Therefore, the charge elimination guide 32 is provided downstream of the turning part. Accordingly, the static electricity generated by the friction with the paper guide body 30 can be eliminated efficiently. By mounting the charge elimination guide 32 on the shaft of the transportation roller 8, when separating the plastic materials and the metal materials for recycling, the charge elimination guide 32 can be removed easily from the side frames 31 by removing the shaft of the transportation roller 8 from the side frames 31. As a result, a disassembling process of the paper guide 3 for recycling becomes easy. Further, to promptly eliminate the static electricity transferred onto the charge elimination guide 32, the charge elimination guide 32 is preferable to be connected electrically and grounded with the electrically conductive member of a frame or the like of the paper transportation device 1.

Figure 7:
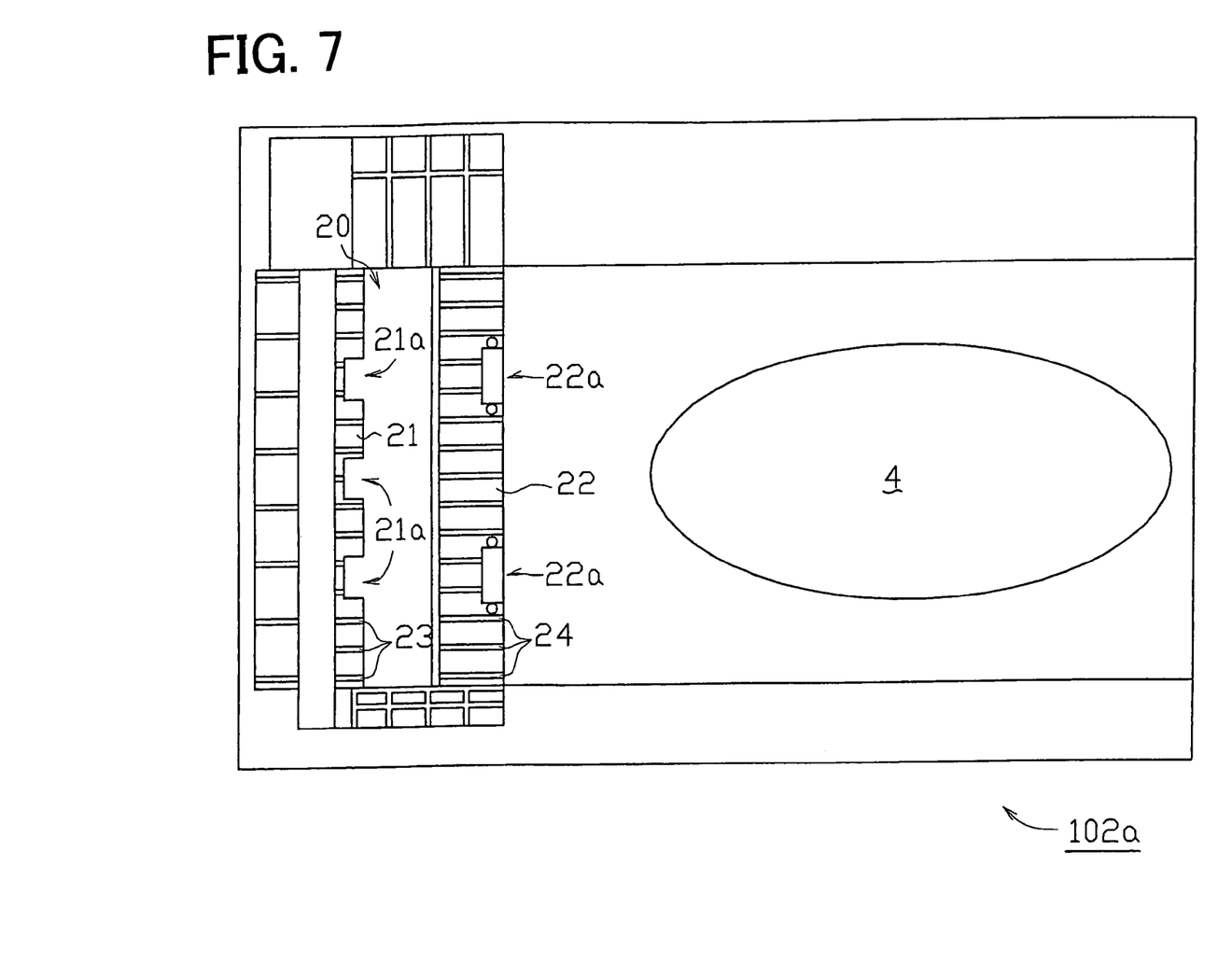

The cover body 102a of the document pressing plate 102 is also made of synthetic resin which can be formed integrally by using the mold, in the same manner as the paper guide body 30 and the side frames 31. For example, the ABS, the high impact polystyrene, or the ABS or the high impact polystyrene added with the reinforcement member such as the glass fiber can be used. As shown in FIG. 2 and FIG. 7, an opening 20 is formed on the cover body 102a where the paper guide 3 is to be mounted. The original document transported along the paper guide body 30 passes the scanning position P on the platen glass 10 at the opening 20, and the image of the original document is scanned by the scanning unit 11.

As shown in FIG. 7, guide surfaces 21 and 22 are formed slanting upwards from the opening 20 at the upstream side and the downstream side of the opening 20, respectively. The guide surfaces 21 and 22 are located downstream of the turning part of the transportation path having the shape of the letter U sideways. The guide surfaces 21 and 22 form the outer guide surface upstream and downstream of the scanning position P. Paper feeding ribs 23 and 24 are also arranged in the width direction on the guide surfaces 21 and 22, respectively, for reducing the friction between the guide surfaces 21 and 22 and the original document that is transported while being slid against the guide surfaces 21 and 22.

On the downstream side edge of the guide surfaces 21 and 22, three cutouts 21a and two cutouts 22a are formed in the width direction, respectively. The driven rollers 81 facing the transportation rollers 8 are disposed in the cutouts 21a and 22a. As described above, the guide surfaces 21 and 22 that form the transportation path are formed integrally with the cover body 102a of the document cover 102. As a result, the assembling process for assembling the guide members to the cover body 102 becomes unnecessary, and a number of components and a number of assembling steps can be reduced.

As shown in FIG. 2, the elastic film 36 is provided on the guide surface 22 of the document pressing plate 102a. In detail, as shown in the drawing, an upstream end of the elastic film 36 is secured on the upstream edge of the guide surface 22. A part of the elastic film 36 downstream of the secured part is not secured on the guide surface 22 and is protruding diagonally upwards under a state capable of being deformed elastically. A downstream end of the elastic film 36 is disposed so as to make contact with the lower surface 320 of the charge elimination guide 32.

By the elastic film 36 disposed in the manner described above, at the downstream of the scanning position P, a vertical width of the transportation path formed by the lower surface 320 of the charge elimination guide 32 and the guide surface 22 is narrowed gradually towards the lower surface 320 of the charge elimination guide 32. The elastic film 36 has strength appropriate for guiding the transported original document to make contact with the charge elimination guide 32. Meanwhile, the elastic film 36 is thin filmed which can be deformed elastically into the guide surface 22 by being in contact with the transported original document. For example, the elastic film 36 may be a synthetic resin film or the like such as polypropylene.

Figure 8A:
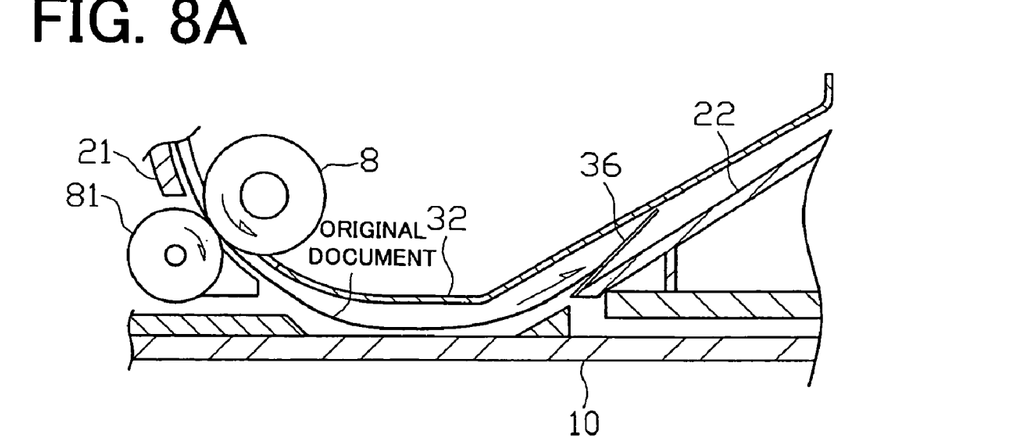
FIG. 8A shows a state in which a transported original document is hitting an elastic film 36.
Figure 8B:
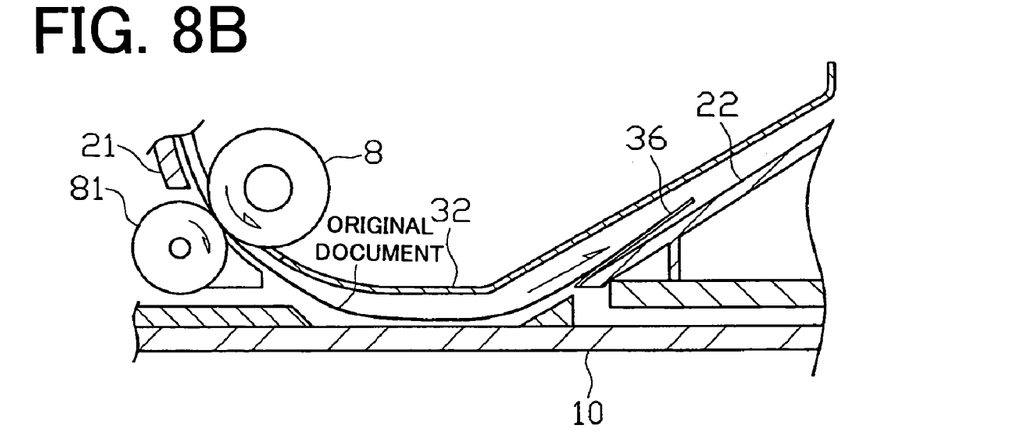
FIG. 8B shows a state in which a downstream side of the elastic film 36 is deformed elastically.
Figure 8C:
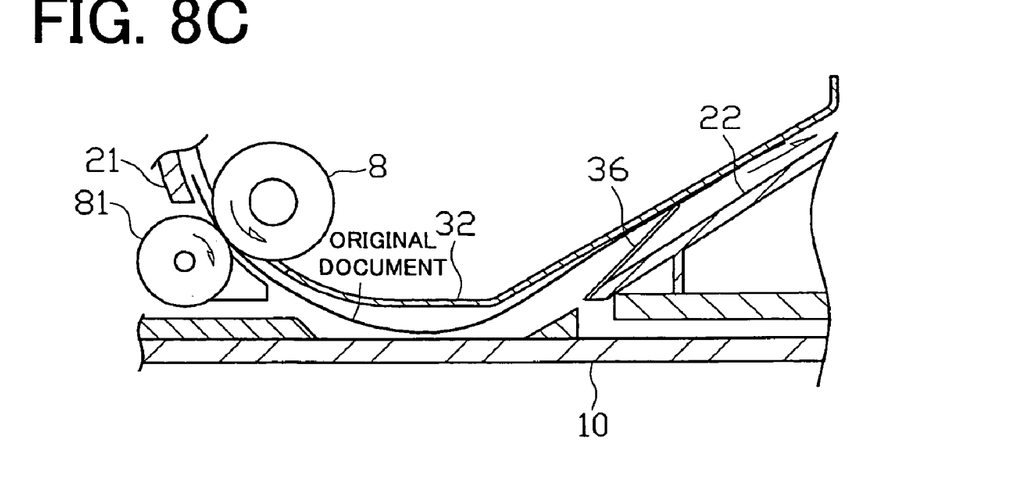
FIG. 8C shows a state in which the elastic film 36 has recovered to an original state for guiding the original document to a charge elimination guide 32.

As shown in FIG. 8A, when the transported original document hits the elastic film 36, the elastic film 36 is urged by the original document. Then, as shown in FIG. 8B, the downstream end of the elastic film 36 is deformed elastically so as to approach the guide surface 22. Consequently, when the original document is transported further, as shown in FIG. 8C, the elastic film 36 recovers to the original state and guides the original document to the charge elimination guide 32.

Accordingly, the transported original document reliably makes contact with the charge elimination guide 32, and the static electricity of the original document is eliminated. As described above, when the original document hits the elastic film 36, the elastic film 36 is deformed elastically. Therefore, an extra load is not applied to the original document. In addition, an influence applied to the transportation speed or the transportation direction of the original document is minute, and the deterioration in image quality of the scanned image is minimum. Further, the elastic film 36 is not necessarily required to be provided to cover the entire range in the width direction of the charge elimination guide 32. Even when the elastic film 36 is provided over the entire range in the width direction according to the required elastic force, the elastic force can be adjusted by forming cutouts in the elastic film 36 or providing the elastic film 36 only in proximity to the center part or as a pair at the left and the right ends of the charge elimination guide 32.

When giving the highest priority to the smoothness of the transportation of the paper between the charge elimination guide 32 and the elastic film 36, a slight gap can be formed between the downstream end of the elastic film 36 and the lower surface 320 of the charge elimination guide 32 for approximately a thickness of the standard paper, without contacting the downstream end of the elastic film 36 against the lower surface 320 of the charge elimination guide 32.

The structures of the paper transportation device 1 and the copy-and-facsimile multifunction peripheral 100 described in the present embodiment are just an example. The design of the paper transportation device 1 and the copy-and-facsimile multifunction peripheral 100 may be changed appropriately without departing from the spirit of the present invention. For example, the scanning unit may be provided exclusively, not to be used in combination with the flat bed scanner. In place of the scanning unit of the reduced optical system using the CCD, a Contact Image Sensor (CIS) can be used. Furthermore, the CCD or the CIS can be provided at opposing positions of the transportation path, respectively. Alternatively, a document returning path can be provided to the transportation path having the shape of the letter U sideways, and both sides of the original document can be scanned.

What is claimed is:

1. A paper transportation device comprising:
 a paper guide body, which forms an inner guide surface of a transportation path;
 side frames on which a shaft of a transportation member disposed in the transportation path for transporting an original document is mounted;
 a gear shaft of a drive transmitting gear, which is provided in a standing condition on the side frames and transmits a rotation of a drive source to the shaft of the transportation member,
 wherein the paper guide body, the side frames and the gear shaft are formed integrally by resin, and
 wherein a charge elimination guide formed of an electrically conductive member is disposed on the paper guide body, and the charge elimination guide forms a guide surface downstream of a turning part of the transportation path having a sideways letter-U shape; and
 an elastic film which is an outer guide surface downstream of the turning part of the transportation path having the sideways letter U-shape, is provided facing the charge elimination guide and guides transported paper so that the transported paper makes contact with the charge elimination guide,
 wherein the elastic film slants upwards from a scanning position towards a downstream side.

2. A paper transportation device comprising:
 a paper guide body, which forms an inner guide surface of a transportation path;
 side frames on which a shaft of a transportation member disposed in the transportation path for transporting an original document is mounted;
 a gear shaft of a drive transmitting gear, which is provided in a standing condition on the side frames and transmits a rotation of a drive source to the shaft of the transportation member,
 wherein the paper guide body, the side frames and the gear shaft are formed integrally by resin,
 wherein the gear shaft is supported by a tip end of the gear shaft being fit in a supporting hole of a bracket, which supports the drive source, in a manner that there is play between the tip end of the gear shaft and the supporting hole, and
 wherein a charge elimination guide formed of an electrically conductive member is disposed on the paper guide body, and the charge elimination guide forms a guide surface downstream of a turning part of the transportation path having a sideways letter U-shape; and
 an elastic film which is an outer guide surface downstream of the turning part of the transportation path having the sideways letter U-shape, is provided facing the charge elimination guide and guides transported paper so that the transported paper makes contact with the charge elimination guide,
 wherein the elastic film slants upwards from a scanning position towards a downstream side.

3. A paper transportation device, comprising:
 a guide plate disposed at a guide surface, the guide plate slanting upwards from a scanning position towards a downstream side, wherein the guide plate is disposed slanting upwards towards a diagonally downstream side from the guide surface to another guide surface,
 wherein the another guide surface is slanting upwards from the scanning position towards the downstream side; and
 a free end of the guide plate inclined elastically to the guide surface.

4. The paper transportation device according to claim 3, wherein an inner guide surface slanting upwards from the scanning position is a charge elimination guide, and an outer guide surface is the guide plate inclined downwards.

5. The paper transportation device according to claim 3, wherein the free end of the guide plate is disposed in close contact with a charge elimination guide that is the another guide surface.

6. The paper transportation device according to claim 3, wherein the free end of the guide plate is disposed by maintaining a gap from a charge elimination guide that is the another guide surface.

7. The paper transportation device according to claim 3, further comprising a document tray to feed original documents.

8. The paper transportation device according to claim 7, further comprising a paper feeding member to feed the original documents from the document tray.

9. The paper transportation device according to claim 3, further comprising a transportation path having an entrance.

10. The paper transportation device according to claim 7, further comprising a scanner to scan the original documents.

11. The paper transportation device according to claim 3, further comprising a discharge tray to discharge paper.

* * * * *